United States Patent [19]

Schwarz

[11] 4,438,167
[45] Mar. 20, 1984

[54] NOVEL POROUS FABRIC

[75] Inventor: Eckhard C. A. Schwarz, Neenah, Wis.

[73] Assignee: Biax Fiberfilm Corporation, Neenah, Wis.

[21] Appl. No.: 204,578

[22] Filed: Nov. 6, 1980

Related U.S. Application Data

[62] Division of Ser. No. 85,228, Oct. 15, 1979.

[51] Int. Cl.$^3$ .............................................. B32B 3/10
[52] U.S. Cl. .................................... 428/138; 428/260; 428/265; 428/272; 428/286; 428/290; 428/904; 428/910
[58] Field of Search ............... 428/131, 137, 212, 220, 428/260, 265, 272, 286, 290, 904, 910, 138

[56] References Cited

U.S. PATENT DOCUMENTS

| | | | |
|---|---|---|---|
| 2,994,617 | 8/1961 | Proctor | 428/138 |
| 3,725,520 | 4/1973 | Suzuki et al. | 428/910 |
| 4,095,012 | 6/1978 | Schermer | 428/910 |
| 4,116,892 | 9/1978 | Schwarz | 428/910 |

*Primary Examiner*—James J. Bell
*Attorney, Agent, or Firm*—Louis E. Marn; Elliot M. Olstein

[57] ABSTRACT

There is described a process for producing a novel porous fabric having at least 100,000 surface perforations per square inch by the biaxial stretching at ambient temperatures of a sheet of a composite fiber-film substrate formed by hot calendaring, inter alia, a laminate of a woven or non-woven web of fibers having a residual elongation of at least 40% and a synthetic polymeric film material constituting at least 20% by volume of the composite fiber-film substrate. Stretching of the composite fiber-film substrate is effected by passage through interdigitating grooved rollers having grooves spaced at a distance of less than one millimeter times the web basis weight in grams per square meter with concomitant control of the velocity of introduction of the composite fiber-film substrate into the nip of the grooved rollers to substantially the identical surface velocity of the grooved rollers. Biaxial stretching is effected to at least a stretch ratio such that a web of the fibers and film of the synthetic polymer taken individually and biaxially stretched exhibit a difference of at least 5° in the aqueous contact angle and a difference of at least 5000 psi in the initial tensile modulus. The novel porous fabric is comprised of elongated fibers embedded in a film substrate surface with openings of at least 100,000 perforations per square inch and is useful as a leather substitute, synthetic paper and the like.

4 Claims, No Drawings

NOVEL POROUS FABRIC

This is a division, of application Ser. No. 085,228, filed Oct. 15, 1979.

BACKGROUND OF THE INVENTION

This invention relates to a novel porous fabric and a process for manufacturing same, and more particularly to a novel porous fabric having surface openings of at least 100,000 perforations per square inch and a process for forming such novel porous fabric from a composite fiber-film substrate.

Many non-woven and (continuous filament spun-bonded fabric or webs have found use in the market as substitutes for textile materials. Such webs consist of randomly laid fibers, either in the form of short staple lengths or continuous filaments, which are undrawn or only partially drawn, and have therefore not obtained their optimum strength. In my copending application U.S. application Ser. No. 900,720 filed Apr. 27, 1978, there is disclosed in a preferred embodiment, a process and apparatus for bi-axially and incrementally stretching a web of synthetic fiber in a first and second station wherein the first and second stations are provided with sets of rolls having grooves parallel and perpendicular, respectively, to the axis of each set of rolls. The groove pattern of each set of rolls is such that the distance between grooves is less than 1.0 millimeters times the web basis weight in grams per square meter. The non-woven web of synthetic material is stretched in a manner to affect uniform stretching between bonding points of each individual fiber thereby producing a web of bi-axially larger dimension and correspondingly reduced base weight.

In U.S. Pat. No. 4,116,892, assigned to the same assignor as the present invention, there is disclosed a process for the selective stretching of incremental portions of a substrate of a synthetic thermoplastic material selected from the group consisting of a thermoplastic orientable polymer or a blend of a thermoplastic orientable copolymer in which there is admixed an incompatible second phase selected from the group consisting of an incompatible polymer or inorganic material. The substrate is stretched in grooved roller pairs by controlling the velocity of introduction of the substrate to maintain the velocity substantially identical to the surface velocity of the roller pair to form an opaque, low density porous sheet useful as a printing substrate, such as synthetic paper; as a substitute for leather; as a highly fibrillated sheet which can easily be shredded into fine fibrils to be used as substitutes for paper-making pulps, or as a filter material, such as battery separators.

In U.S. Pat. No. 2,994,617 there is disclosed a process for producing multi-layer, water-vapor permeable, scuff resistant sheet materials comprising a compressed interconnecting pore-containing layer of non-woven matted fibers bound together with an extensible polymeric binder and adhered thereto a surface layer of a perforated, extensible, scuff-resistant polymeric material. Porosity of the pore-containing layer is effected by stretching a composite layer generally after perforation of the surface layer of the polymeric material. Formation of the base layer requires permeation of the non-woven mat of fibers with a solution or suspension of binder having flow properties at a temperature at least 50° F. below the deformation temperature of the fibers of the non-woven mat. The resulting sheet of material is subjected to the steps of hot pressing and pressure cooling to solidify the binder and form the desired stratum. Surface coating, perforation of the surface coating and stretching of the stratum follow to form the resulting product having a surface with from 300 to 30,000 perforations per square inch and a porosity measured by the leather permeability value (LPV).

OBJECTS OF THE PRESENT INVENTION

An object of the present invention is to provide a novel porous fabric having a surface having at least 100,000 perforations per square inch.

Another object of the present invention is to provide a novel porous fabric having a surface having at least 100,000 perforations per square inch and of high porosity for non-fiber and polymer solvent fluids.

Still another object of the present invention is to provide a novel process for the manufacture in a facile manner of such a novel porous fabric.

Various other objects and advantages of the present invention will become apparent from the following detailed description of an exemplary embodiment thereof with the novel features thereof being particularly pointed out in the appended claims.

SUMMARY OF THE INVENTION

The novel porous fabric of the present invention having a surface of at least 100,000 perforations per square inch is produced by the biaxial stretching at ambient temperatures of a composite fiber-film substrate formed by hot calendaring, inter alia, a laminate of a woven or non-woven fiber web of fibers having a residual elongation of at least 40% and a synthetic polymeric film material constituting at least about 20% by volume of the composite fiber-film substrate. After fusion of the polymeric film into the fiber web, the composite fiber-film substrate is cooled under ambient pressure conditions and is thereafter biaxially stretched at ambient temperatures from 1.1 to 3 times initial dimension in an interdigitating roller systems by introducing the composite fiber-film substrate into the nips of grooved rollers of such interdigitating roller system having grooves (either perpendicular and/or parallel to the axis of the roller pairs) spaced a distance of less than one millimeter times the web basis weight in grooves per square meter of the composite substrate together with the controlled velocity introduction of the substrate into the nip of the grooved rollers. Biaxial stretching is effected to at least a stretch ratio such that a web of thermplastic fibers and a film of the synthetic polymer taken individually and biaxially stretched exhibit therebetween a differnce of at least 5° in the aqueous contact angle and a difference of at least 5000 psi in the initial tensile modulus (Mi). The resulting porous fabric is comprised of elongated fibers embedded in polymer substrate with at least 100,000 surface perforations per square inch and exhibiting a porosity of from 10 to 70 percent, as more fully hereinafter described.

DETAILED DESCRIPTION OF THE INVENTION

The fibers used in the present invention to form the fiber web are those synthetic fibers having a residual elongation of at least about 40%. Generally, most of the fibers used to form the fiber web will be those formed from thermoplastic materials, such as the linear polyamides, e.g. polyhexamethylene adipamide, polyhexamethylene sebacamide, polycaproamide and interpolyamides; and polyesters, and polyesteramides, and mixtures or blends thereof such as dibasic diamide or amino acid polyamides dibasic dihydroxy acid/polyester and intermixed polyester/polyamide products, etc. The fiber web may be of either of the woven form or of the non-woven form such as prepared, for example, in accordance with the process described in U.S. Pat. No. 3,849,241.

The film material is selected from the group consisting of thermoplastic polymers, thermosetting polymers, thermosetting polymers including inorganic fillers, blends of orientable polymer with an incompatible polymer or inorganic material. The film material should have a melting point of about 40° C. below the melting point curing temperature of the fiber material.

In a preferred form of the present invention, the woven or non-woven fiber web is laminated with a sheet of the film material and pressed together, such as by hot calendar rollers, although other methods of fusing the film material into the fiber structure may be employed, e.g. impregnation, co-melt blowing, and the like.

Fusion of the film material into the fiber structure is effected at a temperature of at least 20° C. above the melting point of the fiber material and 20° C. below the melting point curing temperature or polymerization temperature of the fiber material.

The sheet substrate or stratum is thereafter cooled under ambient conditions of temperature and pressure. In this regard, pressure cooling is avoided, since pressure cooling has the effect of more closely bonding the film material within the fiber structure whereby stretching of the resulting composite substrate inhibits the breaking-away of the film material from the fibers and thereby results in a less porous product as well as a product of reduced surface perforations per square inch. It has been observed that if the two substrates are too similar in physical and surface-chemical properties, the adhesion between the two phases becomes too strong and the composite substrate stretches like a single phase film, and no porosity developes. Generally, the resulting composite substrate has a basis weight of from 15 to 500 grams per square meter thereby defining a thickness of a composite substrate at a given density.

The thus cooled composite substrate or stratum is thereafter stretched at ambient temperatures in a grooved roller assembly, such as described in my co-pending U.S. application Ser. No. 900,720, filed Apr. 27, 1978 and my U.S. Pat. No. 4,116,892. Accordingly, the composite substrate is introduced into the nip of a pair of interdigitating rollers having lands and falls defining grooves spaced at distances of less than one millimeter times the web basis weight in grams per square meter of the composite substrate with concomitant controlling of the velocity of introduction of the composite substrate into the nip of the rollers to maintain the velocity substantially identical to the surface velocity of the rollers to stretch incremental portions of the composite substrate. With interdigitating rollers having grooves parallel to the axis of the rollers, there is effected a longitudinal stretching by controlled velocity introduction to prevent slipping of the composite substrate and thus a deflection into the shape of the grooves whereas with grooves perpendicular to the axis of the rollers there is effected a lateral stretching with controlled velocity introduction to prevent narrowing of the composite substrate, and thus a deflection into the grooves. While the composition of the composite substrate and basis weight, etc. generally define the resulting stretch ratio, it is understood that stretch ratio is effected by the separation distances between each roller of the roller pair.

Generally, for most applications the composite substrate is to be biaxially stretched in a plurality of stations of grooved rollers having grooves for lateral and longitudinal stretching depending on the desired characteristics of the resulting product.

For best results, the longitudinal and lateral stretching steps are repeated alternately through multiple passes each having a relatively low draw ratio, until the total permissible draw ratio is reached. The number of longitudinal and lateral passes, as well as the extent of the stepwise draw ratios, can be chosen so that a final film is obtained with the desired properties.

The cold stretching of the composite substrate causes some of the fiber-film interface to separation and result in a product having surface openings of at least about 100,000 perforations per square inch and having a porosity of from 10 to 70% as more fully hereinafter described. As hereinabove discussed, the fibers used in the process of the present invention must have a residual elongation of at least about 40 percent, lest the fibers rupture during stretching. Stretching of the composite substrate causing pore formation also increases the tensile strength of the resulting product due to fiber elongation. While not fully understood, interface separation is believed to occur because of the differences of extensibility of the phases, and the fact that during stretching, the fibers generate new surfaces which have low or no adhesions to the material of the film phase.

As hereinabove mentioned, the fiber web and film material must exhibit after individual and like stretching as that of the composite substrate, a difference in surface tension as observed by the wetting angle of at least 5 degrees and a difference in tensile modules of elasticity of 5000 psi. It will be noted from the Examples which follow that the fiber material may have a higher or lower degree of contact angle or modules of elascity, respectively, than the film material, provided however, that the minimum differences as hereinable set forth are established to obtain the porous fabric of the present invention having the desired surface perforations and porosity. Additionally, a uniform composite substrate must comprise at least twenty percent (20%) by volume of the film material since a lesser amount of film material would result in the incomplete wetting of the fibers by the film material, and thus a porous composite substrate which upon stretching could exhibit non-uniform porosity. Further, the porous fabric of the present invention can have uniform pore structure and size, since the composite substrate may be prepared from fiber webs of uniform fiber diameter as well as uniform fiber-film basis weight ratios. The resulting porous sheet of the present invention has applications as filter materials, synthetic papers or synthetic leathers for upholstery covering, shoes, rain wear and the like. Such a porous fabric can be made water permeable or water repellent, depending on the choice of fibers or films and/or by impregnating repelling agents into the pores after stretching at a temperature in the range of from 20° to 90° C., and conveniently at room temperature.

In order to produce porosity into the porous fabric, it is not necessary to use the combination: higher melting fiber—lower melting film phase. The film phase can be impregnated into the fiber web from a solution with subsequent evaporation of the solvent (which is not a solvent for the fiber-phase) at a lower temperature, or from a monomeric mixture condensing into a higher melting polymer, provided the condensation temperature or polymerization temperature is lower than the melting point of the fiber material, and the monomers of the film phase are not a solvent for the fibers. The film phase can consist of an elastomeric material whereby stretching of the fibers will occur while the film phase elongates and separates from the fiber phase. Upon release of the stretching tension, the composite substrate shrinks back to about its original dimension, the fibers coil up in the channels thus generated and enhance the porosity.

Porosity of the porous fabric may be calculated from the dimensions and the density of the components according to the formula:

% porosity = $[1 - d_p(f_a/d_a + f_b/d_b)] \cdot 100$; where:
$d_p$ = density of the porous fabric (g/cm$^3$) = Basis weight (g/m$^2$) ÷ thickness (u)
$f_a$ = weight fraction of fiber
$d_a$ = density of fiber (g/cm$^3$)
$f_b$ = weight fraction of film phase
$d_b$ = density of film phase The resulting porous fabrics have an open cell pore structure being permeable to vapors and liquids having similar surface tensions as the substrates.

EXAMPLES OF THE INVENTION

Operation of the process is described in the following examples which are intended to be merely illustrative and the invention is not to be regarded as limited thereto.

EXAMPLE I

A commercially available "Reemay" polyester continuous filament spun-bonded web of a 20 micron filament size and having a basis weight of 67 grams per square meter is placed on a film of commercially available "PROFAX 6523" filled polypropylene (40% Ca CO$_3$/60% by weight polypropylene) of a basis weight of 100 grams per square meter to form a laminate substrate. Layers (12"×12") of the laminated substrate sandwiched between coated fabrics for ready release are placed in a laboratory press and pressed at a pressure and temperature of 30,000 psig and 180° C. for three minutes to form a dense, translucent composite substrate with the polyester film structure being observable under microscope. The layers after cooling are introduced and passed at room temperature through two sets of pairs of grooved rollers having grooves parallel and perpendicular respectively to the axis of the roller pair and having a distance between grooves of 1.5 millimeters to effect a biaxial stretch ratio of 1.3 by 1.3x. The thus formed porous fabric is impregnated with a 5% solution of organic ammonium sulfonate wetting agent in methanol. After evaporation of the methanol, the porous fabric is readily wettable with water, as well as with methanol or heptane. The porous fabric exhibited the following properties:

| Basis Weight (gms/m$^2$) | 98 |
| Porosity (%) | 52% |
| Surface Orifices (perf/m$^2$) | 55 × 10$^4$ |
| Orifice Diameter (microns) | 0.5–8 |

The fiber web and film material pressed and individually stretched under like conditions exhibited the following properties:

|  | Control Angle (°) | Tensile Modulus (psi) |
| --- | --- | --- |
| fiber | 81 | 21 × 10$^4$ |
| film | 89 | 18 × 10$^3$ |

Porosity is calculated in accordance with the hereinabove set forth formula whereon surface orifices and orifice diameter is observed by electron-stereoscan microscopy.

EXAMPLE II

A composite substrate prepared in accordance with the process of Example I is biaxially stretched at room temperature to a stretch ratio of 1.1 by 1.1x in the sets of groove rollers of Example 1 but with each groove roller pair being more separated from one another. The resulting porous fabric exhibited the following properties:

| Basis weight (gms/m$^2$) | 138 |
| Porosity (%) | 27 |
| Surface Orifices (perf/m$^2$) | 40 × 10$^4$ |
| Orifice Diameter (microns) | 15–25 |

The fiber web and film material pressed and individually stretched under like conditions exhibited the following properties:

|  | Control Angle (°) | Tensile Modulus (psi) |
| --- | --- | --- |
| fiber | 81 | 15 × 10$^4$ |
| film | 91 | 15 × 10$^3$ |

EXAMPLE III

A commercially available non-woven polyester (polyethylene terephthalate) web consisting of 100% ¼" long staple fibers of 12 micron filament size and basis weight of 70 grams per square meter is placed on a film of commercially available polypropylene film of a basis weight of 70 grams per square meter to form a laminate substrate. The laminate sheet substrate is treated as described in Example I to form composite substrate and likewise stretched at room temperatures to a biaxial stretch ratio of 1.1 by 1.1x. The resulting porous fabric exhibited the following properties:

| Basis weight (gms/m$^2$) | 116 |
| Porosity (%) | 22 |
| Surface Orifices (perf/m$^2$) | 25 × 10$^4$ |
| Orifice Diameter (microns) | — |

The fiber web and film material pressed and individually under like conditions exhibited the following properties:

|  | Control Angle (°) | Tensile Modulus (psi) |
| --- | --- | --- |
| fiber | 82 | 37 × 10$^4$ |
| film | 93 | 8.5 × 10$^4$ |

EXAMPLE IV

A commercially available nylon-6/6 continuous filament spun-bonded web of a 20 micron filament size and having a basis weight of 90 grams per square meter is placed on a polyurethane film of a basis weight of 120 grams per square meter to form a laminate sheet substrate. A laminate sheet substrate sandwiched between coated fabric for ready release is placed in a laboratory press and pressed at a pressure and temperature of 30,000 psig and 170° C. A dense, translucent composite substrate is formed and is biaxially stretched at room temperature in the apparatus of Example 1 to a stretch ratio of 1.4 by 1.4x. The resulting porous fabric exhibited the following properties:

| | |
|---|---|
| Basis weight (gms/m$^2$) | 102 |
| Porosity (%) | 55 |
| Surface Orifices (perf/m$^2$) | 35 × 10$^4$ |
| Orifice Diameter (microns) | — |

The fiber web and film material pressed and individually stretched under like conditions exhibited the following properties:

| | Aq. Control Angle (°) | Tensile Modulus (psi) |
|---|---|---|
| fiber | 75 | 31.5 × 10$^4$ |
| film | 59 | 55 × 10$^4$ |

EXAMPLE V

A commercially available ("CEREX") continuous Nylon-6/6 filament spun-bonded web of a 20 micron filament size and a basis weight of 80 grams per square meter is coated with a PVC-plastisol liquid comprised of 60% by weight polyvinyl chloride powder and 40% by weight dioctyl phthalate. The coated web sandwiched between coated fabrics for ready release is placed in a laboratory press and pressed at a pressure and temperature of 20,000 psig and 160° C. for five minutes to form a dense composite substrate having a basis weight of 210 grams per square meter. The composite substrate is passed at room temperature through the stretching apparatus of Example I to effect a biaxial stretching to a biaxial stretch ratio of 1.4 by 1.4x. The resulting porous fabric exhibited the following properties:

| | |
|---|---|
| Basis weight (gms/m$^2$) | 107 |
| Porosity (%) | 37 |
| Surface Orifices (perf/m$^2$) | 60 × 10$^4$ |
| Orifice Diameter (microns) | — |

The fiber web and film material pressed and individually stretched under like conditions exhibited the following properties:

| | Aq. Contact Angle (°) | Tensile Modulus (psi) |
|---|---|---|
| fiber | 75 | 31.5 × 10$^4$ |
| film | 68 | 26 × 10$^3$ |

EXAMPLE VI

A melt-blown spun-bonded web of Nylon-6 of continuous filaments of 9.5 to 100 micron diameter and a basis weight is cold laminated to a polypropylene film and cold pressed. After pressing, the fiber web is not uniformly impregnated by the polypropylene film, apparently because the melt viscosity of the polypropylene is too high to permit a uniform penetration into the small voids between fibers.

EXAMPLE VII

A melt-blown spun-bonded web of Nylon-6 like Example 6 of continuous filament is impregnated with a 10% solution by weight polyurethane ("ESTANE" 5708) in tetrahydrofuran to form an impregnated sheet substrate having a fiber to film ratio of 40 to 60 after evaporation of the solvent. The sheet substrate sandwiched between coated fabrics for ready release is placed in a laboratory press and pressed at a pressure and temperature of 20,000 psig and 150° C. for three minutes to a dense composite substrate having a basis weight of 130 grams per square meter. The composite substrate is passed at room temperature through the stretching apparatus of Example 1 to effect a biaxial stretching to a biaxial stretch ratio of 2.0 by 2.0x. The resulting porous fabric exhibited the following properties:

| | |
|---|---|
| Basis weight (gms/m$^2$) | 33 |
| Porosity (%) | 58 |
| Surface Orifices (perf/m$^2$) | 1.2 × 10$^6$ |
| Orifice Diameter (microns) | 0.5–3 |

The porous fabric is permeable to methanol and acetone, but not water.

The fiber web and film material pressed and individually stretched under like conditions exhibited the following properties:

| | Aq. Contact Angle (°) | Tensile Modulus (psi) |
|---|---|---|
| fiber | 72 | 81 × 10$^3$ |
| film | 58 | 52 × 10$^3$ |

EXAMPLE VIII

The porous fabric of Example 7 is cut into a 12"×12" sheet and heated at 90° C. for 30 seconds whereupon the sheet shrinks to a dimension of 8.5"×8.5" and exhibited the following properties:

| | |
|---|---|
| Basis weight (gms/m$^2$) | 65 |
| Porosity (%) | 65 |

EXAMPLE IX

Nylon-6 (density of 1.19 grams per cubic centimeter and melting point of 220° C.) and extendable polyurethane (density of 1.15 grams per cubic centimeter and melting point of 140° C.) are simultaneously melt-blown through respective 1" wide melt-blowing dies, similar to that described in U.S. Pat. No. 3,849,241 producing fibers of from 0.5 to 2 microns. The respective fibers thoroughly mixed in air are collected as a loose matt having a basis weight of 250 grams per square meter. The extrusion conditions for each material is as follows:

| Conditions | "NYLON"-6 | "ESTANE" 5708F |
|---|---|---|
| Die width (inches) | 2.1 | 2.1 |
| No. of die orifices | 64 | 64 |
| Capillary size: | | |
| length (inches) | .75 | .75 |
| diameter (inches) | .025 | .025 |
| Fiber diameter (microns) | 0.5–2.0 | 0.5–2.5 |
| Die temperature (°C.) (air temperature) | 380 | 340 |
| Airpressure in die (psi) | 18 | 14 |
| Resin throughput (gms/orifice/min.) | 0.9 | 1.2 |
| Resin throughput diez (gms/min.) | 57.6 | 76.8 |
| Matte width (inches) | 2–2.5 | 2–2.5 |
| Die to drum distance (inches) | | 18 |
| Die to mixing distance (inches) | | 12 |
| Speed of collecting drum (m/min.) | | 9.4 |

The matte sandwiched between coated fabrics for ready release is placed in a laboratory press and pressed at a pressure and temperature of 20,000 psig and 160° C. for three minutes to form a dense composite substrate by destroying the fiber structure of the polyurethane phase and forming a film phase within the fiber structure of the nylon-6 fibers. The composite substrate is biaxially stretched at room temperature in the apparatus of Example 1 to a stretch ratio of 1.8 by 1.8x. The resulting porous fabric exhibited the following properties:

| Basis weight | (gms/m$^2$) | 77 |
|---|---|---|
| Porosity | (%) | 43 |
| Surface Orifices | (perf/m$^2$) | $1.9 \times 10^6$ |
| Orifice Diameter | (microns) | — |

The fiber web and film material pressed and individually stretched under like conditions exhibited the following properties:

| | Aq. Contact Angle (°) | Tensile Modulus (psi) |
|---|---|---|
| fiber | 72 | 85,000 |
| film | 62 | 65,000 |

EXAMPLE X

A composite matte substrate prepared in accordance with Example 9 is biaxially stretched at a temperature of 150° C. in the stretching apparatus of Example 1 to a stretch ratio of 1.5 by 1.5x. No porosity developed.

The fiber web and film material pressed and individually stretched under like condition exhibited the following properties:

| | Aq. Contact Angle (°) | Tensile Modulus (psi) |
|---|---|---|
| fiber | 73 | $61 \times 10^3$ |
| film | 69 | $57 \times 10^3$ |

EXAMPLE XI

A melt-blown web of high density polyethylene of continuous filaments of about 5 microns and a basis weight of 85 grams per cubic meter is impregnated at a weight ratio of 1 to 2 with 10 parts by weight of polypropylene oxide of MW1000 and 1.74 parts by weight of toluene2,4-diisocyanate with the mixture being catalyzed by 1.0 percent by weight triethylamine. After 16 hours at room temperature and under slight pressure, the monomeric resin is polymerized within the fiber structure. The composite substrate is biaxially stretched at room temperature in the apparatus of Example 1 to a stretch ratio of 1.3 by 1.3x. the resulting porous fabric exhibited the following properties

| Basis weight | (gms/m$^2$) | 150 |
|---|---|---|
| Porosity | (%) | 38 |
| Surface Orifices | (perf/m$^2$) | $30 \times 10^4$ |
| Orifice Diameter | (microns) | — |

The unimpregnated fiber web and like polyurethane film material individually pressed and separatly stretched under like conditions exhibited the following properties:

| | Aq. Contact Angle (°) | Tensile Modulus (psi) |
|---|---|---|
| Fiber | 89 | $87 \times 10^3$ |
| film | 61 | $67 \times 10^3$ |

EXAMPLE XII

Composite substrates as formed in accordance with Example 10 are subjected to like biaxial stretch ratio as the unimpregnated fibers and polymeric film phase with the following porosity results:

| | Stretch Ratio | Aq. Contact Angle (°) | Mi | Porosity (%) |
|---|---|---|---|---|
| fiber | 1.2 by | 57 | $55 \times 10^3$ | 2 |
| film | 1.2x | 55 | $52 \times 10^3$ | |
| fiber | 1.5 by | 61 | $59 \times 10^3$ | 2 |
| film | 1.5x | 59 | $55 \times 10^3$ | |
| fiber | 1.8 by | 65 | $65 \times 10^3$ | 12 |
| film | 1.8x | 60 | $58 \times 10^3$ | |

It can be seen from the Examples that separation of interfaces and pore formation is related to adhesion, which in turn is determined by surface properties such as hardness compressability and surface tension. We ting angles have been found to be related to surface tension (W. A. Zisman, Contact Angles Wettability and Adhesion, Adv. Chem Series. #43 R. G. Gould Ed. 1964). In the Examples, pore formation did not occur when the modulus of the two substrates (fiber and film phase) was within 5000 psi. and the contact angles within 5 degrees when the individual substrates were similarly stretched. Modulus changes drastically during the stretching process due to molecular orientation. Generally, the modulus of the fibers increases faster than the modulus of the film phase, and in the final stage there is substantial difference between the two phases, hence: pore formation. In cases where the substrates are very similar, and modulus after stretching and contact angle are within the above cited range, adhesion is too strong and no pore formation occurs. It is important to measure modulus and contact angle at the temperature where the stretching step is performed, which for all practical purposes is about room temperature. If stretching is performed at some elevated temperature, pore formation may not occur even for composites which lead to pore formation at a lower stretching temperature, since at the higher temperature both modulus and contact angle are within a narrower range. Consequently, pore formation is not only a factor of the two substrates materials but also a factor of the stretching temperature.

While the present invention has been described with reference to biaxial stretching the composite substrate, it will be understood that a porous fabric of the required surface openings and porosity may be formed by unilateral stretching (one or more passes) the composite fabric in a grooved roller set having grooves which are parallel or perpendicular to the axis of the grooved roller set.

Numerous modifications and variations of the present invention are possible in light of the above teachings and, therefore, within the scope of the appended claims, the invention may be practiced otherwise than as particularly described.

What I claim is:

1. A porous fabric comprised of a web of elongated synthetic thermoplastic fibers imbedded in a film of a synthetic polymer, said web of elongated synthetic fibers imbedded in said film of said synthetic polymer being biaxially stretched, said thermoplastic fibers and said synthetic polymer exhibiting a difference in aqueous contact angle of at least 5° and a difference in initial tensile modulus of 5000 psi between a web of said thermoplastic fibers and a film of said synthetic polymer when individually stretched, said porous fabric having surface openings of at least 100,000 perforations per square inch.

2. The porous fabric as defined in claim 1 wherein said synthetic polymer is selected from the group consisting of thermoplastic polymers, thermosetting polymers, thermosetting polymers including inorganic fillers, blends of orientable thermoplastic polymers with an incompatible second phase selected from the group consisting of an incompatible polymer or inorganic material.

3. The porous fabric as defined in claim 1 wherein the melting point of said synthetic polymer is lower than the melt curing temperature of said thermoplastic fibers.

4. The porous fabric as defined in claim 1 when said porous fabric is impregnated with a wetting agent.

* * * * *